US010023015B2

(12) United States Patent
Estenne

(10) Patent No.: US 10,023,015 B2
(45) Date of Patent: Jul. 17, 2018

(54) HEAVY VEHICLE TIRE BEAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Vincent Estenne, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 221 days.

(21) Appl. No.: 14/652,446

(22) PCT Filed: Dec. 11, 2013

(86) PCT No.: PCT/EP2013/076190
§ 371 (c)(1),
(2) Date: Jun. 15, 2015

(87) PCT Pub. No.: WO2014/090861
PCT Pub. Date: Jun. 19, 2014

(65) Prior Publication Data
US 2015/0328939 A1 Nov. 19, 2015

(30) Foreign Application Priority Data

Dec. 14, 2012 (FR) ...................... 12 62061

(51) Int. Cl.
*B60C 15/06* (2006.01)
*B60C 5/00* (2006.01)
(52) U.S. Cl.
CPC ............... *B60C 15/06* (2013.01); *B60C 5/00* (2013.01); *B60C 15/0628* (2013.01);
(Continued)

(58) Field of Classification Search
CPC . B60C 15/06; B60C 15/0628; B60C 15/0635; B60C 2015/065; B60C 15/0009
(Continued)

(56) References Cited

U.S. PATENT DOCUMENTS

| 4,155,394 A | * | 5/1979 | Shepherd | .............. B60C 9/0042 139/426 R |
| 2005/0087281 A1 | * | 4/2005 | Durif | ...................... B60C 15/06 152/539 |
| 2008/0006360 A1 | | 1/2008 | Korte et al. | |

FOREIGN PATENT DOCUMENTS

| AU | 18630 | 8/1970 |
| EP | 2 055 988 | 8/1969 |

(Continued)

OTHER PUBLICATIONS

English machine translation of JP07-164837, dated Jun. 1995.*

*Primary Examiner* — Robert C Dye
(74) *Attorney, Agent, or Firm* — Cozen O'Connor

(57) ABSTRACT

Heavy vehicle tire with two beads (2) contacting rim (3) an outer face (21), radial carcass reinforcement (4) having carcass layer (41) wound within each bead (2) around bead wire (5) having center (O) to form turnup (411), additional circumferential reinforcement (6), in each bead (2), having additional layer (61, 62), additional reinforcement (6) extending radially from radially inner end ($E_1$) to radially outer end ($E_2$) and axially on outerside of axially outermost turnup (411). The orthogonal projection ($P_1$) of radially inner end ($E_1$) of additional circumferential reinforcement (6) onto axially outer face (21) of bead (2) is radially on outside of center (O) of bead wire (5), the orthogonal projection ($P_2$) of radially outer end ($E_2$) of additional circumferential reinforcement (6) onto axially outer face (21) of the bead (2) contacting point ($P'_2$) of rim (3) that is axially on inside of point (C) of last contact of rim (3) when
(Continued)

tire (1) is mounted and inflated, and radial distance (d) between end ($E_1$) and end ($E_2$) of additional circumferential reinforcement (6) is at most 20 mm.

8 Claims, 1 Drawing Sheet

(52) U.S. Cl.
CPC .... *B60C 15/0635* (2013.01); *B60C 2015/065* (2013.01); *B60C 2015/0657* (2013.01)

(58) Field of Classification Search
USPC .......................................................... 152/543
See application file for complete search history.

(56) References Cited

FOREIGN PATENT DOCUMENTS

| | | | |
|---|---|---|---|
| EP | 1 174 289 | | 7/2001 |
| EP | 1 925 469 | | 5/2008 |
| FR | 2 840 562 | | 12/2003 |
| FR | 2 935 297 | | 3/2010 |
| JP | 07-164837 | * | 6/1995 |
| JP | 2003-048409 | | 2/2003 |

* cited by examiner

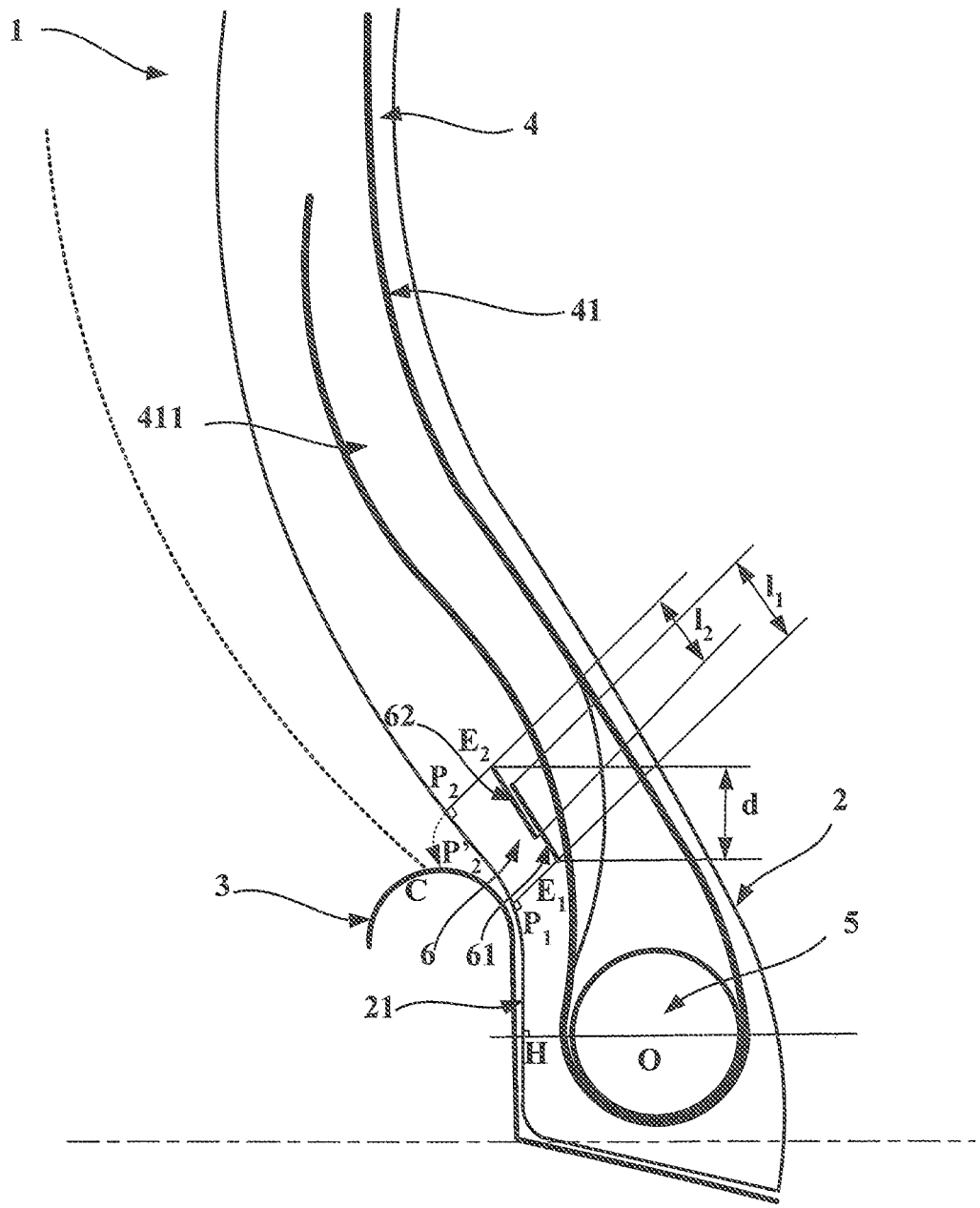

HEAVY VEHICLE TIRE BEAD

RELATED APPLICATIONS

This is a U.S. National stage of International application No. PCT/EP2013/076190 filed on Dec. 11, 2013.

This patent application claims the priority of French application no. 1262061 filed Dec. 14, 2014 the disclosure content of which is hereby incorporated by reference.

FIELD OF THE INVENTION

The present invention relates to a radial tire intended to be fitted to a heavy vehicle, of the heavy goods vehicle, construction plant, metro or aeroplane type.

The invention relates more particularly to the beads of the tire, namely to those parts of the tire, which are respectively connected by two sidewalls to a tread, which provides the mechanical connection between the tire and the rim on which it is mounted.

BACKGROUND OF THE INVENTION

Because a tire has a geometry exhibiting symmetry of revolution about an axis of rotation, its geometry can be described in a meridian plane containing its axis of rotation. In a given meridian plane, the radial, axial and circumferential directions refer respectively to the directions perpendicular to the axis of rotation, parallel to the axis of rotation and perpendicular to the meridian plane. In what follows, the expressions "radially inner" and "radially outer" respectively mean "closer to the axis of rotation in the radial direction" and "further from the axis of rotation in the radial direction". The expressions "axially inner" and "axially outer" respectively mean "closer to the equatorial plane in the axial direction" and "further away from the equatorial plane in the axial direction", the equatorial plane being the plane perpendicular to the axis of rotation and passing through the middle of the tread.

A radial tire comprises a reinforcement comprising a crown reinforcement, radially on the inside of the tread, and a carcass reinforcement radially on the inside of the crown reinforcement.

The carcass reinforcement of a radial tire comprises at least one carcass layer. A carcass layer is made up of reinforcing elements, or reinforcers, coated in an elastomeric material, which are parallel to one another and make an angle substantially equal to 90°, namely of between 85° and 95°, with the circumferential direction. A carcass layer generally comprises a main part, connecting the two beads together and wound, within each bead, around a circumferential reinforcing element usually made of metal called a bead wire to form a turnup. The meridian section of a bead wire, namely the section through the bead wire on a meridian plane, is circular or inscribed inside a circle, of which the centre is commonly referred to as the centre of the bead wire. The bead wire is usually surrounded by at least one coating material such as, nonexhaustively, an elastomeric material or a textile material, the assembly comprising the bead wire and its coating material constituting a bead wire core. The carcass layer turnup allows the carcass to be anchored in each bead to the bead wire core.

It is also known practice to have, within each bead, an additional reinforcement comprising at least one additional layer. An additional layer comprises reinforcing elements, or reinforcers, coated in an elastomeric material, parallel to one another and making with the circumferential direction an angle generally at most equal to 45° and typically substantially equal to 22°. The additional reinforcement extends radially between its two, radially inner and radially outer, ends and axially on the outside of the axially outermost turnup. It is the radially inner end of the radially innermost additional layer that is referred to as the radially inner end of the additional reinforcement. Similarly, it is the radially outer end of the radially outermost additional layer that is referred to as the radially outer end of the additional reinforcement. The radial distance between the respectively radially inner and radially outer ends of the additional reinforcement is generally at most equal to 0.3 times the design section height of the tire as defined by the "European Tire and Rim Technical Organisation" or ETRTO standard. The additional reinforcement makes it possible to limit, in the bead, the deradialization of the radial carcass reinforcement, namely the variation in angle of the reinforcers with respect to their initial, substantially 90° angle as a result of circumferential deformations of the portions of elastomeric compound comprised between the reinforcers: this limiting of the deradialization contributes to the durability of the bead.

The carcass layer and additional layer reinforcers are generally either metal cords or reinforcers made up of assemblies of textile filaments, preferably of the aliphatic polyamide or aromatic polyamide type. In the case of reinforcers made up of assemblies of textile filaments, the carcass reinforcement usually comprises several carcass layers, the number of which is determined according to the level of mechanical strength that the carcass reinforcement is required to have.

As far as the rim on which the tire is mounted is concerned, the rim part intended to come into contact with a bead of a tire comprises a substantially circular portion extended radially towards the inside by a substantially radial portion constituting the rim flange intended to come into contact with the axially outer face of the bead and to fix the axial position of the said bead when the tire is mounted and inflated. It also comprises a substantially axial portion or rim seat, extending axially towards the inside from the radially inner end of the rim flange and intended to come into contact with the radially inner face of the bead. A tire according to the invention is intended to be mounted on a rim the seat of which makes an angle of 5° with the axial direction.

During running, the beads of the tire wrap around the substantially circular portions of the rim flanges and are subjected to bending cycles. These bending cycles lead to variations in curvature combined with variations in tension in the carcass layer and additional layer reinforcers. In addition, these bending cycles lead, in the elastomeric materials present in the immediate vicinity of the free ends of the carcass turnup reinforcers and radially outer ends of the additional layer reinforcers, to compressive and tensile forces which generate thermomechanical stresses and strains liable to cause cracks the spread of which could degrade the tire requiring it to be replaced.

Document FR 2055988 has already described, in the case of a radial carcass reinforcement, beads the durability of which is improved with a view to lengthening the life of the tire. Each bead comprises an additional circumferential reinforcement comprising one or more additional layers. An additional layer, substantially parallel to the carcass layers and adjacent to a carcass turnup or to a carcass layer main part comprises metal or textile reinforcers oriented substantially in the circumferential direction, which is where it gets its name of additional circumferential reinforcement. The substantially circumferential reinforcers have the advantage of not having radially outer ends likely to generate local cracks that cause the bead to start to degrade. The circumferential reinforcers may be positioned at a constant or variable spacing so as to optimize the tensile stiffness of the additional layer.

SUMMARY OF THE INVENTION

One object of the present invention is to optimize the radial distance between the respectively radially inner end and radially outer end of an additional circumferential reinforcement while at the same time keeping the durability of the bead obtained with such an additional circumferential reinforcement the same.

This object has been achieved, according to one aspect of the invention, with a heavy vehicle tire comprising:

two beads intended to come into contact with a rim respectively via at least one axially outer face, a radial carcass reinforcement comprising at least one carcass layer wound within each bead around a bead wire having a centre O to form a turnup, an additional circumferential reinforcement, in each bead, comprising at least one additional layer, the additional reinforcement extending radially from a radially inner end as far as a radially outer end and axially on the outerside of the axially outermost turnup, the orthogonal projection of the radially inner end of the additional circumferential reinforcement onto the axially outer face of the bead being radially on the outside of the centre of the bead wire, the orthogonal projection of the radially outer end of the additional circumferential reinforcement onto the axially outer face of the bead being intended to come into contact with a point of the rim that is axially on the inside of the point of last contact of the rim when the tire is mounted on its rim and inflated to a recommended pressure, and the radial distance between the radially inner end and the radially outer end of the additional circumferential reinforcement is at most equal to 20 mm.

The object of the invention is to optimize the radial positioning of the respectively radially inner and radially outer ends of the additional circumferential reinforcement so as to keep only that portion of the additional circumferential reinforcement that is effective from a mechanical standpoint, without degrading the durability of the bead. That makes it possible to optimize the amount of material used for the additional circumferential reinforcement, i.e. to reduce it to the strict minimum required.

In order to achieve this objective, first of all, the radially inner end of the additional circumferential reinforcement needs to be radially positioned in such a way that its orthogonal projection onto the axially outer face of the bead is radially on the outside of the centre of the bead wire. As defined earlier, the radially inner end of the additional circumferential reinforcement is the radially inner end of the radially innermost additional layer, in the event that there are a plurality of additional layers, or the radially inner end of the additional layer in the event of there being just one additional layer.

In other words, the orthogonal projection onto the axially outer face of the bead of the radially inner end of the additional circumferential reinforcement is positioned radially on the outside of the straight line passing through the centre of the bead wire and perpendicular to the axially outer face of the bead.

The inventors have demonstrated by finite-element calculations that, radially on the inside of the straight line passing through the centre of the bead wire and perpendicular to the axially outer face of the bead, the additional reinforcers are often placed under compression and are therefore, on the one hand, mechanically ineffective and, on the other hand, liable to break under compression.

Secondly, the radially outer end of the additional circumferential reinforcement needs to be radially positioned in such a way that its orthogonal projection onto the axially outer face of the bead is intended to come into contact with a point on the rim that is axially on the inside of the point of last contact of the rim, when the tire is mounted on its rim and inflated to a recommended pressure. As defined previously, the radially outer end of the additional circumferential reinforcement is the radially outer end of the radially outermost additional layer, in the event of there being a plurality of additional layers, or is the radially outer end of the additional layer in the event of there being just one additional layer. The point of last contact of the rim is the point on the circular portion of the rim flange, axially on the outside of which the bead of the tire is no longer in contact with the circular portion of the rim flange when the tire is mounted on its rim and inflated to a recommended pressure.

Thus, the optimizing of the radial position of the radially outer end of the additional circumferential reinforcement is performed on the tire mounted on its rim, as defined by the ETRTO standard, and inflated to the inflation pressure recommended for normal use by the ETRTO standard.

The inventors have demonstrated by finite-element calculations that, radially on the outside of the limit point of which the orthogonal projection onto the axially face of the bead is the point of last contact of the axially face of the bead with the circular portion of the rim flange, the additional reinforcers are subjected to tensile forces liable to cause them to break under tension.

Finally, the radial distance between the radially inner end and the radially outer end of the additional circumferential reinforcement is at most equal to 20 mm.

This maximum radial distance is the radial distance beyond which the additional circumferential reinforcement is no longer mechanically effective. It thus makes it possible to minimize the quantity of material of which the said additional circumferential reinforcement is made and therefore contributes to a lower cost of manufacture. This maximum radial distance also guarantees good positioning of the additional circumferential reinforcement during the manufacture of the tire, leading to an advantage in terms of quality of manufacture.

Advantageously, the axial distance between the additional circumferential reinforcement and the axially outer face of the bead is at least equal to 2 mm.

This minimum axial distance is embodied in a safety thickness of elastomeric compound between the additional reinforcement and the rim. That makes it possible to ensure the integrity of the additional circumferential reinforcement with respect to potential external attacks such as impacts, attacks during the operations of mounting or removing the tire and the presence of foreign bodies inserted between the rim flange and the tire.

Advantageously also, the sum of the widths of the additional layers of the additional circumferential reinforcement is at least equal to 20 mm.

Advantageously also, the circumferential tensile tangent stiffness of the or each additional layer of the additional circumferential reinforcement is at least equal to 250 daN/mm.

The circumferential tensile tangent stiffness of an additional layer is the name given to the product of the thickness times the tensile modulus of the material of which the additional layer is made. This minimum circumferential tensile stiffness is required in order to ensure the minimum total level of stiffness tension of the additional circumferential reinforcement on inflation, with a view to effectively combating wearing away of the axially outer face of the bead of the tire in the region of contact with the rim flange. The stiffness tension is the name given to the product of the circumferential tensile tangent stiffness times the cumulative width, namely the sum of the widths of the additional layers in a bead.

The inventors have demonstrated by calculation that the cumulative width of the additional layers allows the additional reinforcement to develop, within each bead, a minimum total stiffness tension of the order of 5000 daN on inflation so as to oppose effectively the wearing away of the axially outer face of the tire bead in the region of contact with the rim flange. This wear is a result of the periodic slippages of the axially outer face of the tire bead with respect to the rim flange when the tire is running.

According to a first alternative form relating to the reinforcers, the or each additional layer of the additional circumferential reinforcement comprises metal reinforcers.

The use of metal reinforcers allows the required minimum tensile stiffness of a given additional layer to be achieved easily.

Advantageously, the metal reinforcers of the or each additional layer of the additional circumferential reinforcement are elastic. An elastic metal reinforcer is characterized by a structural elongation $A_s$, resulting from the relative positioning of the metal threads of which the metal reinforcer is made under a low tensile force, at least equal to 1% and a total elongation at break $A_t$ at least equal to 4%. Furthermore, an elastic metal reinforcer generally has a tensile elastic modulus at most equal to 150 GPa and usually comprised between 40 GPa and 150 GPa.

The use of elastic metal reinforcers makes it possible, because of the nonlinear way in which they behave mechanically under tension, to absorb more easily the circumferential deformations of a given additional layer, which may vary within the width of the additional layer, while at the same time making it possible to achieve the necessary minimum stiffness required for the additional layer. Moreover, this type of reinforcer also makes the tire easier to manufacture because the additional reinforcement becomes easier to shape when passing from a cylindrical position to a toroidal position.

According to a second alternative form relating to the reinforcers, the or each additional layer of the additional circumferential reinforcement comprises reinforcers made of aromatic polyamide. A usual aromatic polyamide is aramid.

Reinforcers made of aromatic polyamide make it possible to achieve the minimum stiffness required for the additional layer while at the same time limiting the mass of this additional layer.

According to a third alternative form, the at least one additional layer of the additional circumferential reinforcement comprises reinforcers made of aromatic polyamide and of aliphatic polyamide. A usual aromatic polyamide is aramid and a usual aliphatic polyamide is nylon. Reinforcers made of aromatic polyamide and of aliphatic polyamide, and more specifically of a collection of spun either aromatic polyamide or aliphatic polyamide filaments are known by the name of hybrid reinforcers.

Reinforcers made up of aromatic polyamide and of aliphatic polyamide also make it possible to achieve the required minimum stiffness for the additional layer while at the same time limiting the mass of this additional layer. In a similar way to elastic metal reinforcers, the nonlinear way in which they behave mechanically under tension allows the circumferential deformations of a given additional layer, which may vary in the width of the additional layer, to be absorbed more easily.

According to one preferred embodiment, the additional circumferential reinforcement comprises at least two additional layers.

Specifically, the minimum stiffness tension criterion for the additional reinforcement upon inflation is more difficult to reach with just one single additional layer, especially in the case of non-metal or non-aromatic reinforcers. The presence of at least two additional layers is more advantageous.

According to a first alternative form of the preferred embodiment, the at least two additional layers of the additional circumferential reinforcement are juxtaposed, which means to say are adjacent along at least one edge.

Subject to the strains of shaping the additional circumferential reinforcement during the course of manufacture, namely when passing from a cylindrical position into a toroidal position, this arrangement makes it possible to minimize the thickness of the additional circumferential reinforcement between the rim flange and the carcass reinforcement.

According to a second alternative form of the preferred embodiment, the at least two additional layers of the additional circumferential reinforcement are fully superposed, which implies that they are of the same width.

This arrangement makes it possible to minimize the impact that the strains of shaping the additional circumferential reinforcement during the course of manufacture has on the homogeneity of the distribution of tension in the additional circumferential reinforcement, the counterpart to this being a local increase in thickness in the additional circumferential reinforcement.

According to a third alternative form of the preferred embodiment, the at least two additional layers of the additional circumferential reinforcement are at least partially superposed, they are then said to be scaled.

This arrangement is somewhere between the first and second alternative forms and therefore offers a compromise between the respective advantages of the said alternative forms.

The invention also relates to a method of manufacturing a tire for a heavy vehicle and, in particular, to the step of laying the at least one additional layer of the additional circumferential reinforcement.

According to a first embodiment, the method of manufacturing a tire for a heavy vehicle comprises a step of laying the or each additional layer of the additional circumferential reinforcement by the helical winding of a continuous reinforcer.

This method offers the advantage of minimizing the number of free ends of the reinforcer that makes up the or each additional layer of the additional circumferential reinforcement.

According to a second embodiment, the method of manufacturing a tire for a heavy vehicle comprises a step of laying the or each additional layer of the additional circumferential reinforcement by the helical winding of at least one strip made up of mutually parallel continuous reinforcers.

By comparison with the first embodiment mentioned hereinabove, the time taken to lay the raw additional circumferential reinforcement is reduced in proportion with the number of threads of which the strip is made.

BRIEF DESCRIPTION OF THE SINGLE DRAWING

The features of the invention will be better understood with the aid of the description of FIG. 1 which is a view in cross section on a meridian plane of a bead of a tire for a heavy goods vehicle according to a preferred embodiment of the invention.

DETAILED DESCRIPTION OF THE SINGLE DRAWING

In order to make it easier to understand, FIG. 1 is not drawn to scale.

FIG. 1 depicts a bead 2 of a tire 1 for a heavy vehicle according to the invention. The bead 2 is intended to come into contact with a rim 3 via at least one axially outer face 21.

The radial carcass reinforcement 4 is made up of a carcass layer 41 wound within the bead 2 around a bead wire 5 having a centre O to form a turnup 411.

The additional circumferential reinforcement 6 comprises two additional layers (61, 62). The additional circumferential reinforcement 6 extends radially from a radially inner end $E_1$ to a radially outer end $E_2$ and axially on the outside of the turnup 411. In the case of FIG. 1, the two additional layers (61, 62) of the additional circumferential reinforcement 6 are partially superposed: they are said to scaled. The radially inner end $E_1$ of the additional circumferential reinforcement 6 is the radially inner end of the radially innermost additional layer 61 whereas the radially outer end $E_2$ of the additional circumferential reinforcement 6 is the radially outer end of the radially outermost additional layer 62. The respective radially inner end $E_1$ and radially outer end $E_2$ of the additional circumferential reinforcement 6 are positioned relative to one another at a radial distance d. The additional layers (l1, l2) have respective widths $l_1$ and $l_2$ which are curved widths measured along the profile of the layers in a meridian plane.

According to the invention, the orthogonal projection $P_1$ of the radially inner end $E_1$ of the additional circumferential reinforcement 6 onto the axially outer face 21 of the bead 2 is radially on the outside of the centre O of the bead wire 5. In other words, the orthogonal projection $P_1$ onto the axially outer face 21 of the bead 2 of the radially inner end $E_1$ of the additional circumferential reinforcement 6 is positioned radially on the outside of the straight line OH passing through the centre O of the bead wire 5 and perpendicular at the point H to the axially outer face 21 of the bead 2.

The orthogonal projection $P_2$ of the radially outer end $E_2$ of the additional circumferential reinforcement 6 onto the axially outer face 21 of the bead 2 is intended to come into contact with a point $P'_2$ of the rim 3 axially on the inside of the point C of last contact of the rim 3 when the tire 1 is mounted on its rim 3 and inflated to a recommended pressure. The profile of the bead of the mounted and inflated tire is depicted in dotted line in FIG. 1.

The invention has been studied in more particular depth in the case of a tire of size 305/75R20 intended to be fitted to a metro train.

At this size, the additional circumferential reinforcement is made up of two partially superposed or scaled additional layers. The additional circumferential reinforcement is made by helically winding two turns of a strip. The strip is made up of aramid reinforcers of 167/2 construction, namely made up of two 167 tex strands twisted together, these reinforcers being distributed at a density of 98 threads/dm.

Numerical simulations have been performed on three tires comprising three different bead configurations in order to evaluate the respective impacts they have on load-bearing wear:

a first tire comprising beads with no additional reinforcement, a second tire referred to as "conventional" comprising beads with an additional reinforcement comprising metal reinforcers making an angle of 22° with the circumferential direction, the additional reinforcement being characterized by a circumferential tensile tangent stiffness equal to 250 daN/mm and by a radial distance between the radially inner end and the radially outer end of the additional circumferential reinforcement equal to 20 mm, a third tire according to the invention comprising beads with an additional circumferential reinforcement made up of two additional layers of aramid reinforcers, the additional reinforcement being characterized by a circumferential tensile tangent stiffness equal to 1200 daN/mm and by a radial distance between the radially inner end and the radially outer end of the additional circumferential reinforcement equal to 10 mm.

The parameter adopted for estimating the intensity of load-bearing wear that the additional reinforcement is supposed to combat is the maximum amplitude of cyclic circumferential movement (expressed in mm) of the points of the bead in contact with the rim in a contact that is assumed to be a perfect sliding contact. The lower the maximum amplitude of cyclic circumferential movement, the more limited the load-bearing wear will be.

For the first tire comprising beads with no additional reinforcement, the calculated maximum amplitude of cyclic circumferential movement is equal to 4.7 mm. For the second tire comprising beads with an additional reinforcement comprising metal reinforcers making an angle of 22° with the circumferential direction, the calculated maximum amplitude of cyclic circumferential movement is equal to 3.2 mm. Finally, for the third tire according to the invention comprising beads with an additional circumferential reinforcement made up of two additional layers of aramid reinforcers, the calculated maximum amplitude of cyclic circumferential movement is equal to 3.8 mm. The calculated maximum amplitude of cyclic circumferential movement for the third tire according to the invention is therefore somewhere between the amplitudes calculated respectively for the first and second tires: this value is considered to be good enough to obtain satisfactorily limited load-bearing wear.

The invention must not be interpreted as being restricted to the foregoing but may be extended to other embodiments such as, for example and nonlimitingly, additional reinforcements comprising additional layers the reinforcers of which are spaced by a constant or variable spacing, are broken up or are wavy.

The invention claimed is:

1. A heavy vehicle tire to be mounted on a rim, the tire comprising:
    two beads configured to come into contact with the rim via at least one respective axially outer face;
    a radial carcass reinforcement comprising at least one carcass layer wound within each bead around a bead wire having a center to form a turnup;

an additional circumferential reinforcement, in each bead, comprising at least two additional layers, the additional circumferential reinforcement extending radially from a radially inner end to a radially outer end and axially on the outside of the axially outermost turnup;

wherein two of the at least two additional layers of the additional circumferential reinforcement are adjacent along a single edge of each of the two additional layers, wherein an orthogonal projection of the radially inner end of the additional circumferential reinforcement onto an axially outer face of the bead is radially on the outside of the center of the bead wire, and wherein an orthogonal projection of the radially outer end of the additional circumferential reinforcement onto the axially outer face of the bead is positioned to come into contact with a point of the rim that is axially on the inside of a point of last contact of the rim when the tire is mounted on the rim and inflated to a recommended pressure.

2. The heavy vehicle tire according to claim 1, wherein the sum of the widths of the at least two additional layers of the additional circumferential reinforcement is at least equal to 20 mm.

3. The heavy vehicle tire according to claim 1, wherein the circumferential tensile tangent stiffness of the at least two additional layers of the additional circumferential reinforcement is at least equal to 250 daN/mm.

4. The heavy vehicle tire according to claim 1, wherein the at least two additional layers of the additional circumferential reinforcement comprises metal reinforcers.

5. The heavy vehicle tire according to claim 1, wherein the at least two additional layers of the additional circumferential reinforcement comprises reinforcers made of aromatic polyamide.

6. The heavy vehicle tire according to claim 1, wherein the at least two additional layers of the additional circumferential reinforcement comprises reinforcers made of aromatic polyamide and of aliphatic polyamide.

7. The heavy vehicle tire according to claim 1, wherein the two additional layers of the additional circumferential reinforcement are partially superposed.

8. The heavy vehicle tire according to claim 1, wherein the radial distance between the radially inner end and the radially outer end of the at least two additional layers of additional circumferential reinforcement is at most equal to 20 mm.

* * * * *